United States Patent

Stluka et al.

(10) Patent No.: US 9,256,846 B2
(45) Date of Patent: Feb. 9, 2016

(54) SYSTEM AND METHOD FOR PERFORMANCE MONITORING OF A POPULATION OF EQUIPMENT

(75) Inventors: Petr Stluka, Prague (CZ); Eva Jerhotova, Prague (CZ); Karel Marik, Revnice (CZ); Ondrej Holub, Prague (CZ); Wendy Foslien, Woodbury, MN (US); Rylan Clark, Kennewick, WA (US)

(73) Assignee: Honeywell International Inc., Morris Plains, NJ (US)

( * ) Notice: Subject to any disclaimer, the term of this patent is extended or adjusted under 35 U.S.C. 154(b) by 106 days.

(21) Appl. No.: 13/473,422

(22) Filed: May 16, 2012

(65) Prior Publication Data

US 2013/0311437 A1 Nov. 21, 2013

(51) Int. Cl.
*G06F 17/30* (2006.01)
*G06Q 10/06* (2012.01)

(52) U.S. Cl.
CPC .......... *G06Q 10/06* (2013.01); *G06F 17/30598* (2013.01)

(58) Field of Classification Search
CPC ... G06Q 10/06; G06Q 10/20; G06F 17/30598
USPC .................. 707/705; 702/182–185, 116, 188
See application file for complete search history.

(56) References Cited

U.S. PATENT DOCUMENTS

| 6,795,798 | B2* | 9/2004 | Eryurek et al. ............... 702/188 |
| 7,096,156 | B2 | 8/2006 | Hosaka et al. |
| 7,373,267 | B2 | 5/2008 | Carroll et al. |
| 2002/0077711 | A1 | 6/2002 | Nixon et al. |
| 2005/0165581 | A1 | 7/2005 | Roba et al. |
| 2007/0021966 | A1* | 1/2007 | Ellefson et al. .................. 705/1 |
| 2008/0086322 | A1* | 4/2008 | Wallace ............................ 705/1 |
| 2009/0157590 | A1 | 6/2009 | Mijares et al. |
| 2009/0271150 | A1 | 10/2009 | Stluka et al. |
| 2011/0126275 | A1* | 5/2011 | Anderson et al. ................. 726/8 |

OTHER PUBLICATIONS

StatSoft Electronic Statistic Textbook—Cluster Analysis, Jun. 29, 2011, www.StatSoft.com.*

* cited by examiner

*Primary Examiner* — Thu-Nguyet Le
(74) *Attorney, Agent, or Firm* — Schwegman Lundberg & Woessner, P.A.

(57) ABSTRACT

A system and method obtain a database stored on a storage device containing information on multiple assets, the information including measurements taken from devices monitoring each asset, and context information corresponding to the environment the items are subjected to. The system and method groups assets via a computer system into a homogenous group as a function of selected context information and performs analytics via the computer system on the grouped assets to manage the assets.

17 Claims, 10 Drawing Sheets

← 660

| Note Creator |
|---|
| Add a Note |
| Hex #: 18 |
| Time Interval: 11/2009 |
| Avg Q(Kcal/hr): 38290778.2578948 |
| Avg Fouling Resistance (Rf) MAX: 0.00397899306383001 |
| Avg Shell Flow Actual (Kg/hr): 1386139.98672693 |
| Avg Tube Flow Actual (Kg/hr): 676418.303708929 |

*FIG. 6E*

SYSTEM AND METHOD FOR PERFORMANCE MONITORING OF A POPULATION OF EQUIPMENT

BACKGROUND

Asset management is an important focus area for companies, such as large enterprises with multiple geographically distributed industrial plants and facilities. Such enterprises most typically include oil and gas field production and processing, refineries and petrochemical plants. A common type of problem in such organizations is the performance monitoring of assets, such as heat exchangers, heaters or pumps, which are usually used in quite large numbers.

The companies usually have some basic asset monitoring functions deployed as part of a general management capabilities or dedicated asset monitoring solutions. The most typical approach involves regular calculation of equipment-specific performance measures (e.g. heat transfer coefficient of a heat exchanger, or efficiency of a heater) and then monitoring of these calculated measures for all assets of the same type. This typically leads to the identification of a list of top ten "worst actors", and consequently, responding to potential problems associated with these worst performing assets in a reactive manner.

One prior method for automatically monitoring the performance of a single piece of equipment includes compiling current operating conditions associated with current performance measure conditions (PMc). A historical database including a plurality of stored operating conditions and associated stored performance measure (PM*) is searched, each stored operating condition including at least one stored sensor reading, wherein at least one similar operating condition is identified in the search using distances between the current operating conditions and the stored operating conditions. The performance measure (PM*) associated with the similar operating condition is fit to generate a regression model. The regression model is applied to the current operating condition to generate an estimate for the performance measure for the current operating condition (PMe). A difference between PMc and PMe is computed. The first difference is compared to a predetermined threshold and a warning is automatically generated if the first difference has a value greater than the predetermined threshold.

SUMMARY

A system and method obtain a database stored on a storage device containing information on multiple assets, the information including measurements taken from devices monitoring each asset, and context information corresponding to the environment the items are subjected to. The system and method groups assets via a computer system into a homogenous group as a function of selected context information and performs analytics via the computer system on the grouped assets to manage the assets.

The method may be encoded on a computer readable storage device in further embodiments.

BRIEF DESCRIPTION OF THE DRAWINGS

FIGS. 6, 6A, 6B, 6C, 6D, and 6E are a block diagram of an interactive dashboard interface according to an example embodiment.

DETAILED DESCRIPTION

Figure 1:
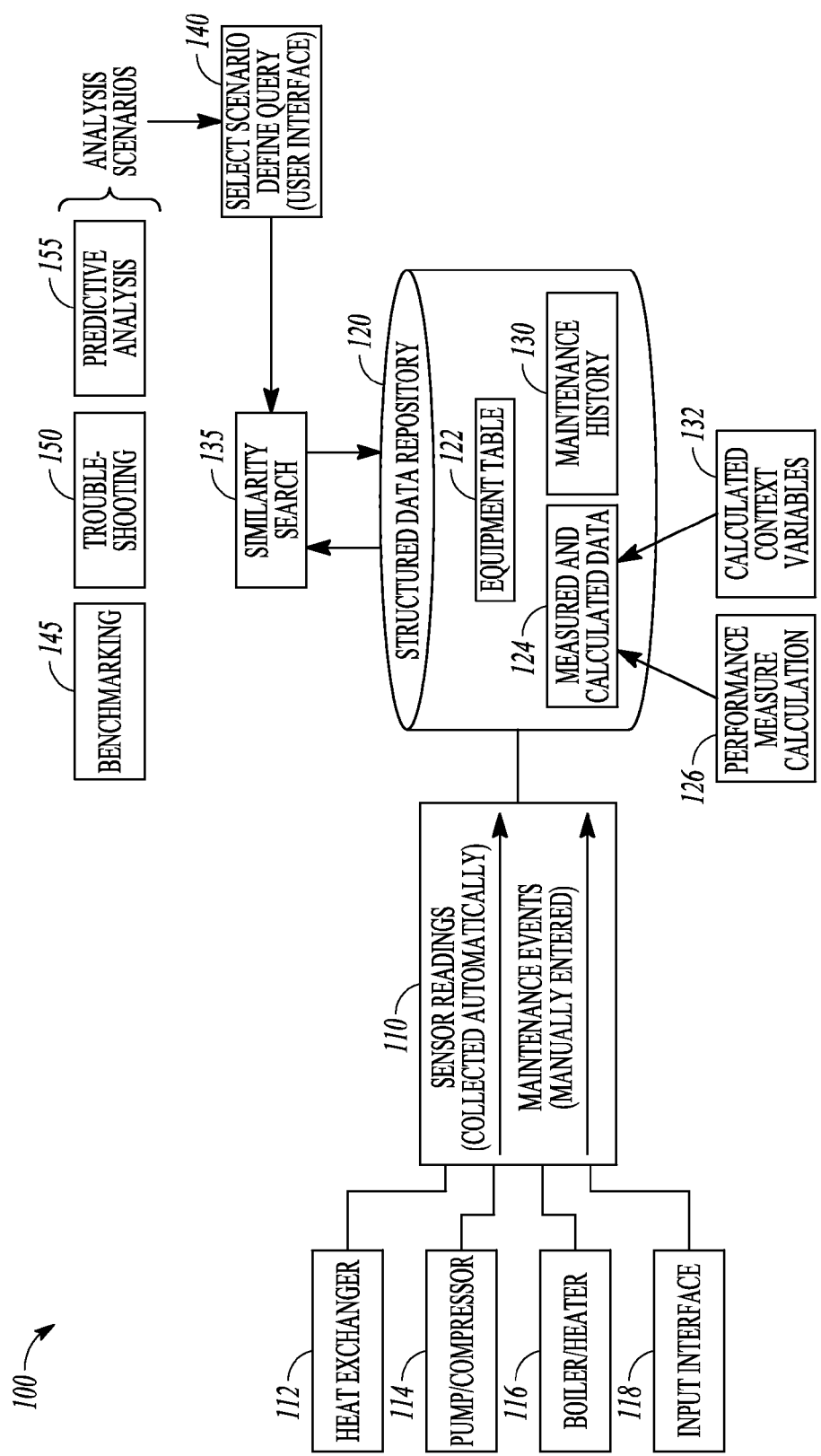
FIG. 1 is a block diagram illustrating a system to perform performance monitoring of a large population of equipment according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software stored on storage devices, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Major challenges identified by the inventors for asset performance monitoring solutions include the need to support more geographic locations; potential lack of domain experts; and a need for sharing of best practices between sites and teams. In various embodiments, a system and method provides performance monitoring that uses principles of similarity analysis and data mining of the operational history of an entire population of similar assets to support the related decision making. Working with the entire population ensures that experience from one site can be leveraged by other sites and improves the consistency of the decision making process.

An overview of the various methods and systems is provided, followed by a description of particular embodiments identified in the figures, and details of a user interface to facilitate use of the methods and systems described.

In addition to the asset management in industrial plants and facilities, the method and system can be applied to performance monitoring of commercial buildings and their mechanical and energy sub-systems, such as lighting or heating, ventilation, air conditioning (HVAC) systems. The mechanical operations and energy consumption of buildings used for office space are typically driven by two contexts: occupancy and weather conditions. In contrast, the mechanical operations and energy consumption of buildings used for manufacturing are typically driven by production rates.

When managing a large portfolio of buildings and prioritizing which buildings are deviating from performance targets, identifying the proper contexts to group buildings together is performed to make useful comparisons.

In some embodiments, raw data from the buildings, such as energy consumption, operating variables, occupancy schedules and external weather conditions is collected. This raw data is used to calculate a key set of context observations such as heating degree days, production rates, occupancy, and use distances between these context variables as part of the grouping and comparison. The raw data is also used to calculate performance indicators, such as energy per unit and total equipment run times. A user interface is provided that utilizes the raw data, context and performance indicator calculations to provide a flexible method to evaluate, group, rank and compare the buildings via context and performance indicators. Relevant raw data is available on demand.

Understanding trends in maintenance needs across a large fleet of vehicles is another domain where asset comparison and ranking is important. Some vehicles may have been used frequently for hauling heavy loads, others may have experienced frequent starts and stops, while others may have been used primarily for highway travel. Vehicles can have different performance indicators, such as the fuel efficiency or emissions acceptability. A number of raw variables may be available, such as oil pressure, engine temperature, overall mileage, emissions levels, or other measurements made during vehicle servicing. When assessing the overall status of the fleet, grouping is done for vehicles that have similar contexts, and ranking and comparison is performed on performance indicator using vehicles that have been used in similar applications.

FIG. 1 is a block diagram of a system 100 and method to perform a data-intensive and history-based concept for performance monitoring of large populations of similar assets. The overall performance monitoring process can be decomposed into the following functional elements. A data collection and archiving element 110 receives sensor readings from multiple assets 112, 114, 116. Each asset is sufficiently instrumented with sensors, which means that all key variables are available with appropriate sampling frequency. For instance, in the case of a heat exchanger, the full instrumentation includes two sensors to obtain flow rate measurements (of hot and cold streams), and four temperature sensors to obtain measurements on inlet and outlet of both hot and cold streams. Maintenance events may be manually entered via an input interface indicated at 118. Input interface 118 may be any type of device capable of accepting user input, or automated input from another system where maintenance data is captured. Maintenance data may be captured by maintenance personnel using networked hand held devices in some embodiments, or input into a networked mobile or stationary computer system in further embodiments.

The data collection and archiving element 110 provides data to a structured data repository 120. In various embodiments, repository 120 may be implemented as a relational database that contains an equipment table 122 containing descriptive attributes and characteristics of individual pieces of equipment. In one embodiment, the equipment table is used to maintain a list of all monitored assets (equipment, vehicles) with unique identifier and descriptive attributes, such as equipment vendor (OEM), construction type, flow arrangement, stream phases, heat exchange area, nominal flow rates, nominal duty, etc.

A portion 124 of repository 120 receives the information captured at element 110, including operating conditions and context variables, and performs calculation of performance measures and context variables in an automated manner, typically by calculation services 126 and 132, that takes the most recent measurements and calculates selected performance measures and context variables. The calculations (e.g. heat transfer coefficients or fouling rates) are added to the measurement data at 124, forming a historical database. Measured and calculated variables may include data points measured around the equipment to date, calculated variables, performance measures (e.g. actual heat transfer coefficient calculated by the service 126), context variables (e.g. time from the last cleaning calculated by the service 132). Each measured or calculated data point has an associated timestamp (date/time) and can be viewed/processed as a time series. Maintenance history 130 includes point-in-time records, which are manually entered by operator or serviceman. Each record includes a timestamp, type of event, and a descriptive annotation.

The calculation service 132 adds more context to the data, enriching the data with additional useful information, such as (in case of heat exchanger) (1) dates when the equipment was cleaned, (2) rate of change of all measured and calculated variables, (3) normalization of selected variables to the design values (e.g. design flow rates, temperatures), (4) information about specific operating modes, (5) location of the equipment in the plant (in the flowsheet), etc.

A similarity search mechanism 135, such as an algorithm executed by a search engine, is coupled to repository 120 and uses similarity criteria to categorize the population of equipment to divide all pieces of equipment into homogeneous groups. Similarity may be computed using various criteria, such as construction type of the heat exchanger (tube/shell, concurrent flow, etc.), stream properties (densities, specific heat capacities), operating modes (ranges of flow rates and temperatures), maintenance history (time from the last cleaning), fouling rate (how quickly is the heat exchanger fouled). Mathematically, the similarity calculations may be based on the principles of Euclidean distance. Example similarity groups may be based on similar contexts, including similar equipment, performance measures, or their arbitrary combination. These groups may be determined on-demand based on a specific analysis scenario selected by the user.

A user interface 140 may be coupled to utilize the similarity search mechanism 135 and the data in the data repository 120 to provide several different analysis scenario based queries. A benchmarking analysis scenario 145 focuses on comparison of similar pieces of equipment. Similarity can be defined according to criteria defined in mechanism 135. One motivation of benchmarking is to help highlight situations when two similar pieces of equipment performed differently—e.g. one is fouled more quickly than the other.

A troubleshooting analysis scenario 150 employs the principle of mining operations history of similar assets to locate similar types of problems, such as when a heat exchanger fouls very quickly. History of similar assets is searched to identify if this situation occurred in the past. If yes, the next step is to understand if the conditions were similar or not—e.g. is it in both cases a consequence of more aggressive operation? Troubleshooting step helps to leverage information about how the past problem was fixed for the current problem.

A predictive analysis scenario 155 uses prediction of future behavior for optimization of maintenance actions, such as cleaning. It helps to assess whether it is possible to operate the heat exchanger differently to change its fouling rate. The scenario 155 involves looking at typical fouling rates of similar heat exchangers.

The calculation of context variables and use of a similarity search to form groups from which different analysis scenarios may be run take advantage of the archived data of the entire population of assets. These steps help to address existing challenges and needs of operating companies, but as described above, they can be used also in other domains, such as buildings performance monitoring, or car fleet maintenance.

Various embodiments may be implemented by coding the described calculation, database, and scenarios and running them as a decision support application in a hosting environment, such as provided by HPS (Honeywell Process Solutions) MES (Manufacturing Execution System) Intuition infrastructure or others. Availability of data collection and archiving capabilities may be provided for example by Honeywell Process History Database (PHD). In various embodiments, the term similarity is used to represent similarity of contexts which can be similarity of equipment, their performance, operating conditions, how dynamically they are changing, etc.

In one embodiment, the equipment table 122 contains information about the population/collection/set of N monitored pieces of equipment (assets) $E=\{E_1, \ldots, E_N\}$. For each monitored piece of equipment $E_i$ there is a set of descriptive attributes $A=AC \vee AN$ characterizing given equipment $E_i$.

This is a combination of categorical and numerical attributes in one embodiment. Categorical attributes $AC=\{AC_1, \ldots, AC_{NC}\}$;

Examples: $AC_1$=construction type (shell and tube; plate; spiral; etc.), $AC_2$=type of flow arrangement (concurrent flow, countercurrent flow, etc.), $AC_3$=stream phases (liquid-liquid, liquid-gas, gas-gas); $AC_4$=upstream unit; $AC_5$=downstream unit, etc.

Numerical attributes $AN=\{AN_1, \ldots, AN_{NN}\}$; Examples: $AN_1$=heat exchange area; $AN_2$=nominal flow rate of the hot stream; $AN_3$=nominal flow rate of the cold stream; $AN_4$=nominal duty, $AN_5$=specific thermal capacity of the hot stream, $AN_6$=specific thermal capacity of the cold stream, etc.

Each measured or calculated variable has a unique relation to a specific i-th equipment $E_i$. Measured variables include independent variables $X=\{X_1, \ldots, X_{NX}\}$ that are typically associated with input streams to the equipment, operating conditions of the equipment, or disturbances coming from the environment. Examples include flow rates of hot and cold streams, inlet temperatures of hot and cold streams, and ambient temperature. Dependent variables $Y=\{Y_1, \ldots, Y_{NY}\}$ are typically associated with output streams of the equipment. Examples include outlet temperatures of hot and cold streams. Calculated variables may be provided by calculation mechanism 132, and typically include context variables $Z=\{Z_1, \ldots, Z_{NZ}\}$. Additional variables may also be included and are calculated using a general mathematical formula $Z=f(X, Y, PM, A, ME, t)$ where PM are performance measures and ME are maintenance events and t is time.

Performance measures $PM=\{PM_1, \ldots, PM_{NP}\}$. There may be more than one performance measure defined for a specific equipment type. Examples may include heat transfer coefficient, fouling resistance. Performance measures PM are provided by calculation mechanism 126.

Each record in the maintenance history 130 has a unique relation to a specific i-th equipment $E_i$. The maintenance history contains a series of records (point-in-time events) $ME=\{ME_1, \ldots, ME_{NM}\}$ describing events that occurred on the given equipment $E_i$ and were recorded by the operator or serviceman.

Each event $ME_j$ may be characterized as follows. A timestamp corresponding to the time of the event. An event type can be one of the following (sample) list: cleaning, mechanical failure (valves), instrument failure (sensors), unspecific fault, etc. An annotation is verbal description of the symptoms observed, actions taken, etc. entered by the operator or serviceman.

Performance measures $PM=\{PM_1, \ldots, PM_{NP}\}$ for given equipment type (e.g. heat exchanger) can be calculated from variables (X,Y) using a general mathematical formula $PM=f(X,Y)$. For an example heat exchanger, PM is the heat transfer coefficient calculated from (X,Y), and specifically using flow rates of both hot and cold streams, and inlet and outlet temperatures of both hot and cold streams.

Alternatively, one of the Y variables is used directly as the performance measure (PM). For an example heat exchanger, the outlet temperature of the cold stream may be used directly as the PM. All calculated performance measures PM are stored in the historical database 124 together with sensor readings (X,Y) and calculated context variables Z.

Examples for a heat exchanger include heat transfer coefficient and fouling resistance factor that may be evaluated by the enthalpy data of each stream, heat exchange area and temperature difference.

For a boiler, the thermal efficiency may be calculated from the heat input and output. For a compressor, polytropic efficiency may be calculated from polytropic head, suction temperature, and pressure ratio. For a pump, pump efficiency may be calculated from pump head and pump flow.

Calculation mechanism 132 performs context variable calculation. Context variables $Z=\{Z_1, \ldots, Z_{NZ}\}$ are calculated by specific calculation formulas that conform to the generic form $Z=f(X, Y, PM, A, ME, t)$.

All calculated context variables Z are stored in a historical database 124, together with sensor readings (X,Y) and performance measures PM. Multiple context variables can be calculated depending on the specific equipment type and the way how it is typically operated.

Some example calculated context variables include: $Z_1$=time from the last cleaning; $Z_1=f(ME, t)$, $Z_2$=normalized flow rate; $Z_2=f(X, A)$, $Z_3$=rate of change of the heat transfer coefficient; $Z_3=f(PM, t)$ Time from the last cleaning is represented as $Z_1$={time now}−{time of the last cleaning event retrieved from the maintenance history}. A normalized flow rate of hot stream is represented as $Z_2$={actual flow rate of the hot stream}/{nominal flow rate of the hot stream}. A rate of change of the heat transfer coefficient U is represented as $Z_3$={'down', 'constant', 'up', 'up abruptly'} depending on specific trend characteristics of U computed over a time interval T.

Rate of change of the flow rates and temperatures can be defined analogically. A percentage degradation of the performance measure PM from the time of the last cleaning is represented as $Z_4$=({PM at time t}−{PM at the time of last cleaning})/{PM at the time of last cleaning}*100%

The similarity search mechanism 135 implements a similarity of assets algorithm that may be defined as considering similarity of the descriptive attributes A which can be combination of categorical (AC) and numerical (AN) ones In one example, all "shell and tube" heat exchangers are considered similar. In a further example, heat exchangers with heat transfer area 40-50 squared meters are considered similar.

Yet further examples may consider the similarity of operating conditions (X), performance measures (Y), or context variables (Z). One example of this type of similarity includes heat exchangers operated at the inlet temperatures of the hot stream between 350 and 400 degrees of Celsius. A further example includes heat exchangers running now for 12 to 15 months from the last cleaning In further embodiments, similarity of the maintenance history may be utilized to identify a group of assets. One example includes heat exchangers with 8 to 10 mechanical failures recorded in the maintenance history. In still further embodiments, a any combination of previous definitions may be used to identify a similarity group. One example includes "shell and tube" heat exchangers operated between 350 and 400 degrees of Celsius (of the inlet temperature of the hot stream) with 8 to 10 mechanical failures.

Similar assets may be searched using categorical attributes, numerical attributes, or their combinations. For categorical attributes, the search engine may perform a search that uses an exact match between categories; e.g. only heat exchangers having "concurrent" flow arrangement are considered, no others are included. This can be implemented by an SQL query with WHERE condition, for instance: FLOW_ARR='concurrent'

For numerical attributes, the search engine utilizes a range parameter R that is specified for each numerical attribute AN, and also the concrete value of the numerical attribute AN to be queried. The similarity search can be implemented by an SQL query with WHERE condition, for instance: AN BETWEEN (AN-R) AND (AN+R).

In case of numerical attributes in some embodiments, identified similar assets may be grouped according to degree of similarity. This may involve the calculation of similarity over J numerical attributes $\{AN_1, \ldots, AN_J\}$ where J≤NN "Degree of similarity" can be calculated using the Euclidean distance:

$$d^2 = \sum_{i=1}^{J} \left( \frac{AN_i - AN_i^*}{R_i} \right)^2$$

where $d^2$ is the squared Euclidean distance between two vectors $AN_i$ and $AN_i^*$. R is the range parameter specified before. Two identical vectors have $d^2$ equal to zero. Two assets characterized by numerical vectors with minimal $d^2$ are considered the most similar.

Three main analysis scenarios include benchmarking 145, trouble shooting 150, and predictive analysis 155. In benchmarking 145, similar pieces of equipment should behave similarly. Deviations may be highlighted, and help understand why they are occurring.

In troubleshooting, information about how the past problem that occurred on one piece of equipment was fixed may be leveraged to solve the current problem occurring on another similar piece of equipment.

In predictive analysis, a prediction of future behavior may be used to optimize maintenance actions, such as cleaning, to assess whether it is possible to operate the asset differently to change its performance degradation, leveraging information about degradation trends observed on similar pieces of equipment.

Figure 2:
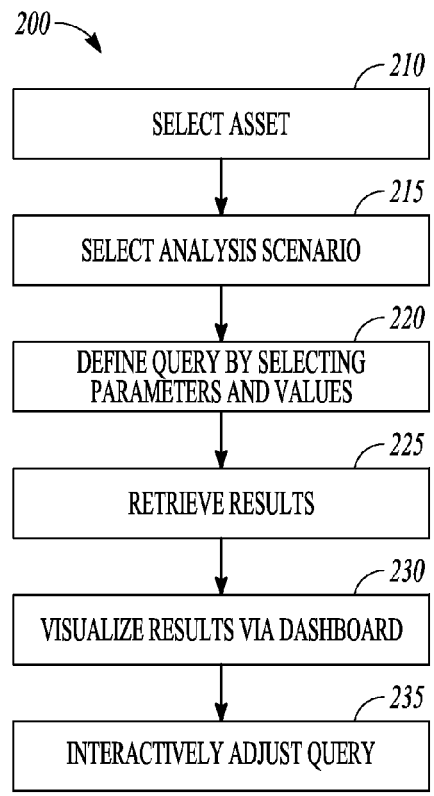
FIG. 2 is a flow diagram illustrating an analysis process for performance monitoring of a large population of equipment according to an example embodiment.

In general, an analysis process 200 proceeds as illustrated in flowchart form in FIG. 2. At 210, an asset is selected. The selected asset may be the asset that needs to be examined against the rest of the population In the benchmarking scenario the selection may be skipped as it makes sense to analyze the population as a whole. An analysis scenario is then selected at 215 from benchmarking, troubleshooting, and predictive analysis. Other analysis scenarios may be provided in further embodiments.

At 220, a query is defined by a user selecting parameters (asset attributes, operating conditions, context variables, etc.) and their specific values that will be used to measure the similarity. Examples include (1) "shell and tube" heat exchangers; (2) heat exchangers which currently experience rapid fouling; (3) heat exchangers operated in the range of inlet cold stream temperatures between 10 and 20° C.; (4) heat exchangers operated for more than 2 years from the last cleaning; etc.

Figure 6:
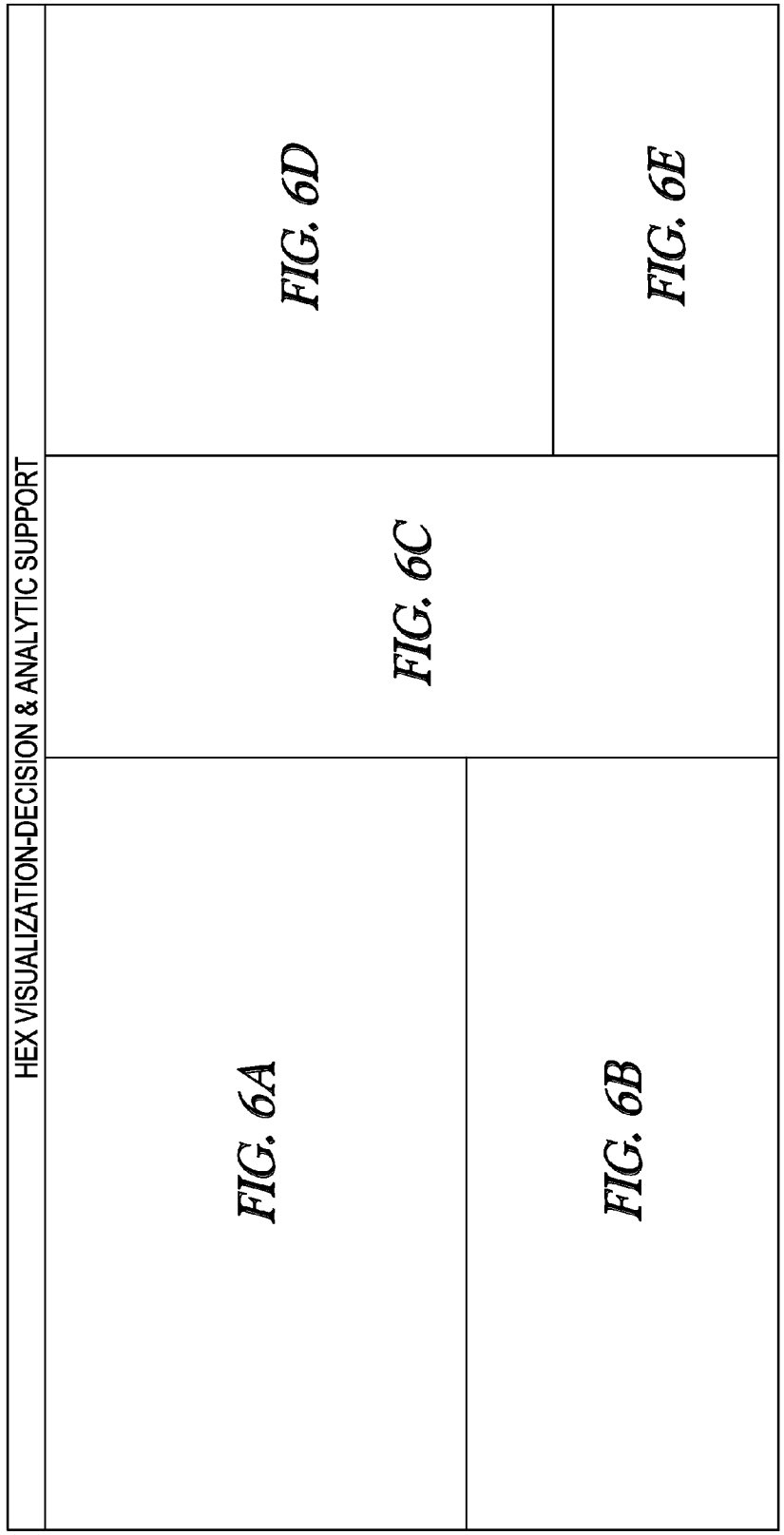
Figure 6A:
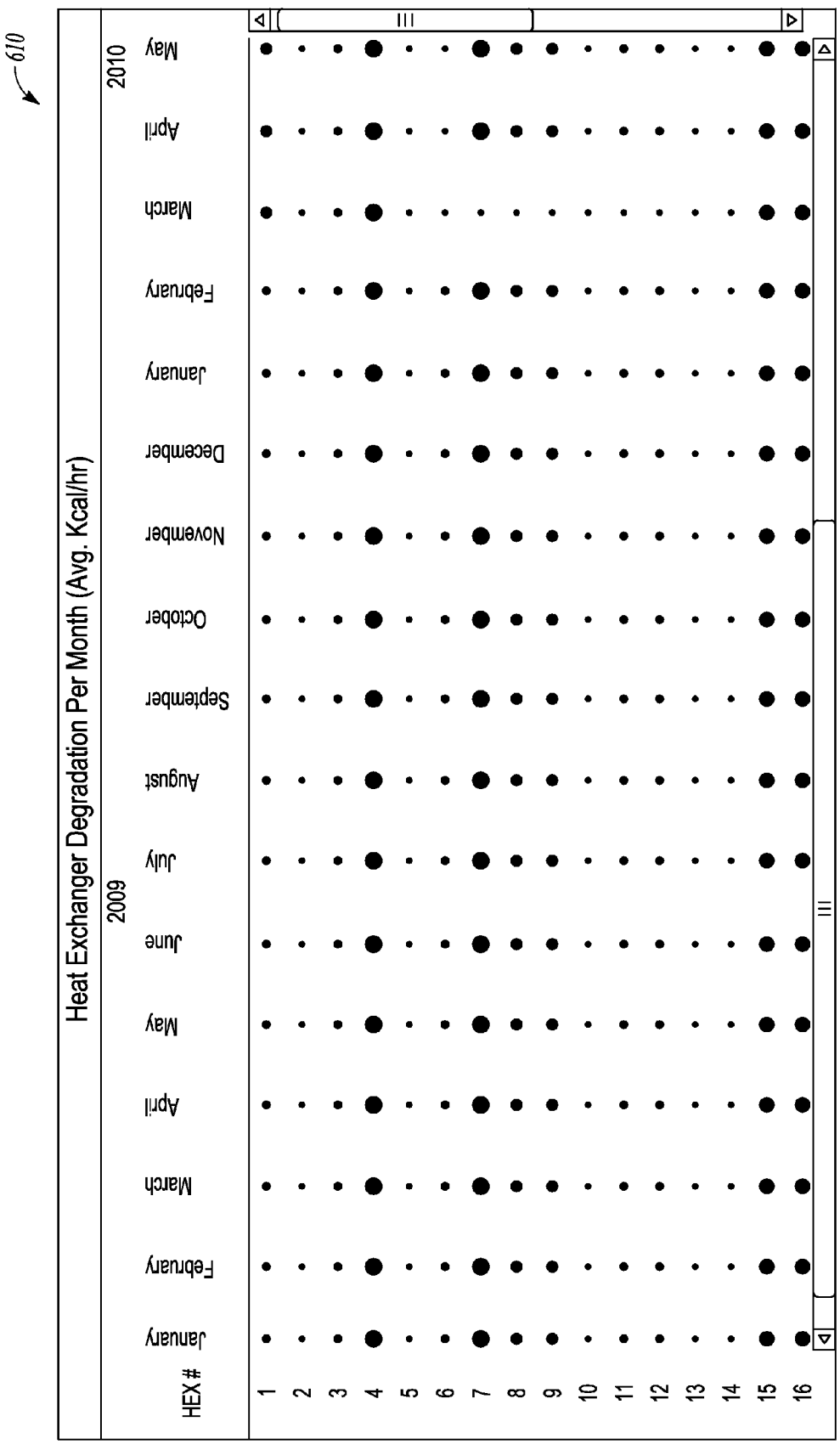
Figure 6B:
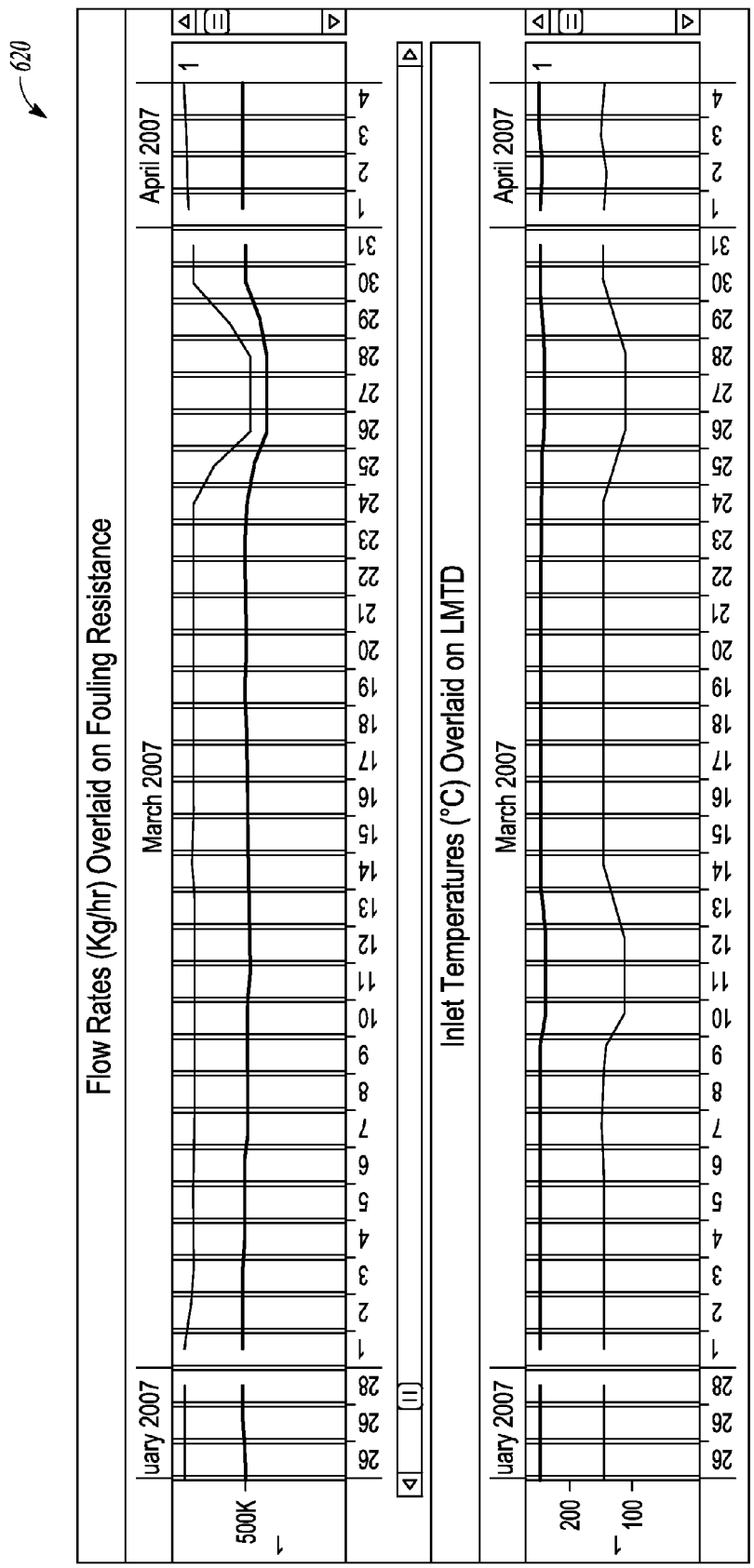
Figure 6C:
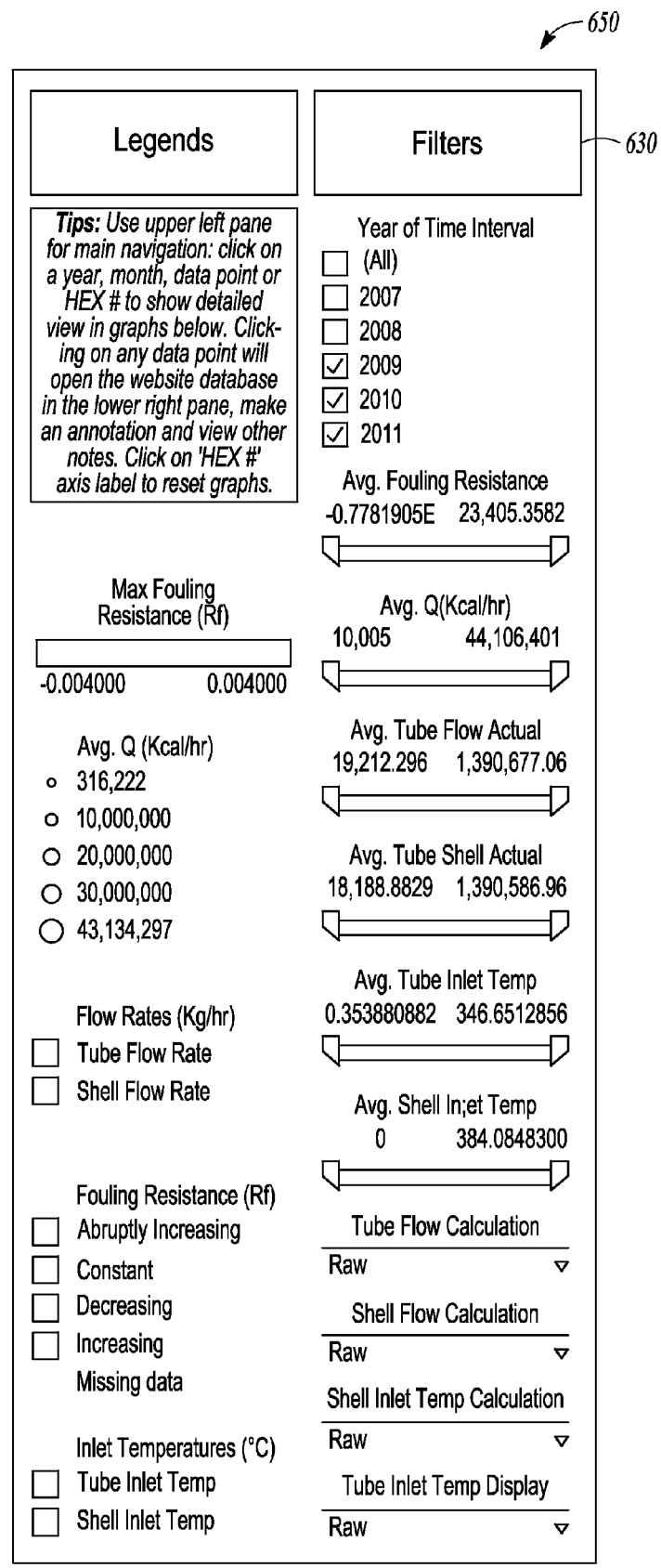
Figure 6D:
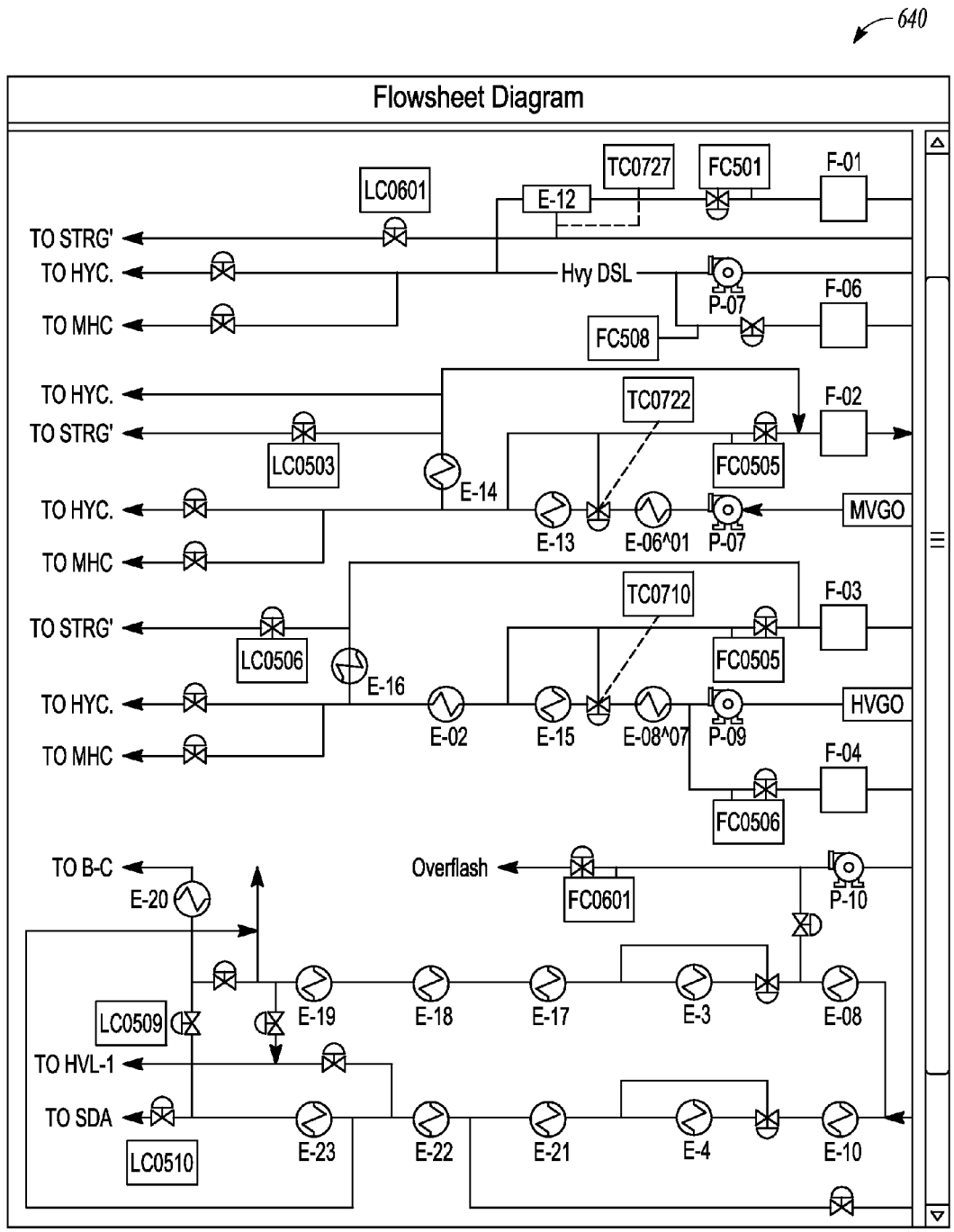

At 225, results are retrieved. The query is applied to the structured data repository 120, and relevant information is retrieved. At 230, the results may be visualized, such as in a dashboard illustrated in FIG. 6 as described below.

At 235, the query may interactively adjusted, such as by returning to any of the previous method elements to select different parameters for the query, a different asset, or a different analysis scenario.

Figure 3:
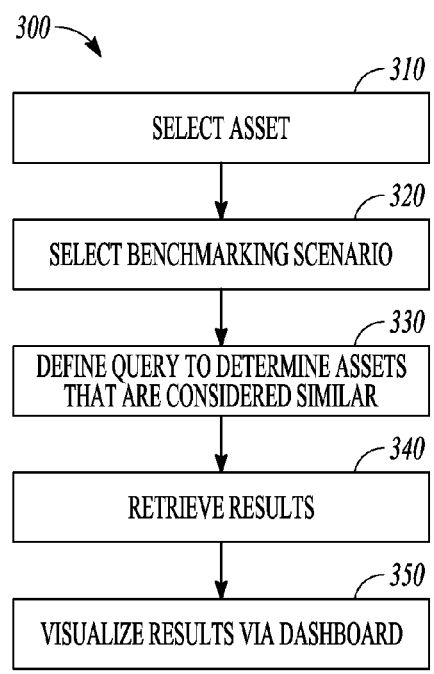
FIG. 3 is a flow diagram illustrating an analysis process for performing benchmarking analytics according to an example embodiment.

A method of performing a benchmarking scenario is illustrated at 300 in flowchart form in FIG. 3. At 310, an asset is selected. One specific asset may be compared with others, or all similar assets may be compared to each other. At 320, the benchmarking scenario is selected, and a specific performance measure PM is selected that will be used for benchmarking.

At 330, a query is defined that determines which assets will be considered similar. Results are retrieved at 340, and visualized at 350. The results may be visualized in a way to emphasize different values of the performance measure PM—e.g. using a color gradient, or using a size of a point (graphical representation of assets.

Figure 4:
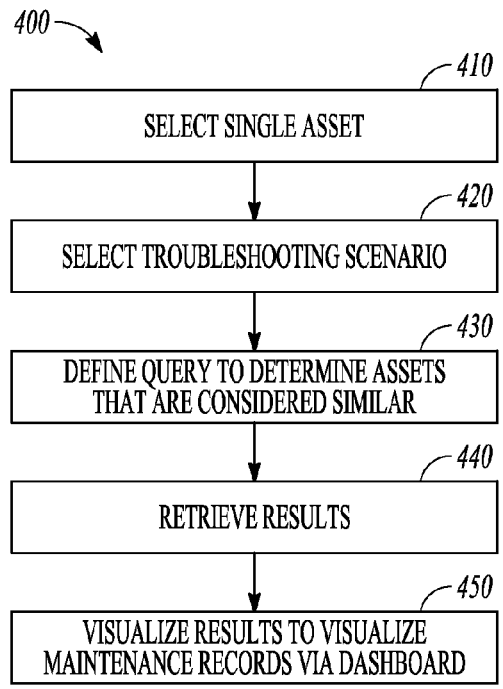
FIG. 4 is a flow diagram illustrating an analysis process for performing troubleshooting analytics according to an example embodiment.

A method of performing a troubleshooting scenario is illustrated at 400 in FIG. 4. At 410, the asset is selected. One specific asset is selected to be analyzed to fix its performance issues, which can have different nature: either short-term (mechanical and instrument failures) or long-term (performance degradation).

At 420, the troubleshooting scenario is selected, and at 430, a query is defined to identify which assets will be considered similar. Examples may include assets having similar run-time from the last maintenance/cleaning, assets of similar construction type, assets with similar frequency of problems, assets with similar degradation rate of PM, and assets running under similar operating conditions etc.

At 430, results are retrieved, that include all records from the maintenance history database 130. At 440, results may be visualized in a way to summarize maintenance records for each similar asset. This allows the user to see if similar problems occurred and how they were fixed in a visual manner.

Figure 5:
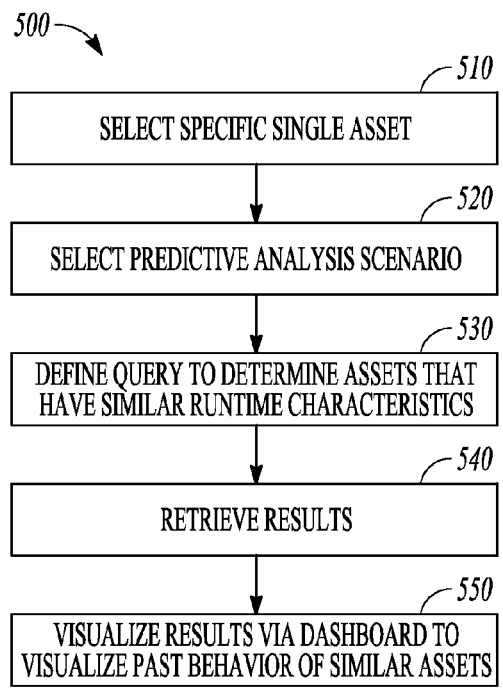
FIG. 5 is a flow diagram illustrating an analysis process for performing predictive analysis analytics according to an example embodiment.

A method of performing predictive analysis is illustrated at 500 in flowchart form in FIG. 5. At 510, the asset is selected. One specific asset is to be analyzed to understand its likely future behavior. At 520, the predictive scenario is selected, and at 530, a query is defined to identify which assets will be considered similar. Examples include assets having similar run-time from the last maintenance/cleaning, assets of similar construction type, and assets running under similar operating conditions etc.

At 540, results are retrieved that include all context variables characterizing long-term trends, rates of change, and other trend-related characteristics. At 550, the results may be visualized in a way to illustrate past behavior of similar assets and highlight trends, which were observed in the past and applies to the specific asset being analyzed.

FIGS. 6, 6A, 6B, 6C, 6D, and 6E are a screen shot of an example interface referred to as a dashboard 600. Dashboard is intended as a decision support tool for HEX (Heat EXchange) asset management in a refinery. A target user would be responsible for monitoring multiple heat exchangers, assessing their performance and making decisions about maintenance, cleaning, adjustment of operating modes, etc. Examples include an asset specialist, console operator, or variability analyst. A subject matter expert on heat exchangers with goals related to plant productivity, reliability and safety. The system 100 presents HEX data through an interactive, readily understood medium, provides pattern recognition 'at a glance', leverages principles of human info-processing, exploits visual system by drawing attention to outliers, and reinforces the data's message through redundancy coding of information via color and shape.

Some example uses include diagnoses and anticipating problematic exchangers. Via the dashboard 600, the system may inform decisions about performing a field check or filing work order. Some factures include heat exchanger name (HX), date intervals, location in flow sheet diagram, Q [Kcal/hr]: Transferred heat: coded as a y-axis dimension and through color, values and measures of spread for Fouling Resistance: Rf=1./Uactual−1./Uexpect, LMTD ('C), and Shell Flow vs. Tube Flow [Kg/hr].

In one embodiment, the dashboard 600 provides visualization with interactivity. The dashboard 600 supports data exploration for quickly assessing process state and engages a user and allows him/her to stay 'in the loop'

May support system analysis for normal and abnormal operating conditions by integrating multiple sources of information into an interactive and intuitive display.

Dashboard 600 consists of several panes, each distinguished by functionality. The top left pane here is a primary starting point for most use cases. HEXs are depicted in terms of Heat Transfer (Q, size of circle) and Fouling Resistance (Rf, color) to provide a high level view of trends/outliers for relative HEX size and fouling over time. Interactions in this pane initiate changes in other parts of the dashboard, as it is also the primary navigation pane.

Top left pane 610 is a global view of all HEXs, providing a comprehensive overview in terms of HEX size and fouling. Pane 610 is geospatial, contributing to a clearer 'mental map' of the refinery. A bottom left pane 620 primarily serves as two exploded views of data in terms of inlet temps and flow rates overlaid on Fouling resistance. Interactivity is provided by selecting a HEX in the upper left pane 610, that may provide detailed data views in the other panes, highlight its location and link to it's portion of the database for notetaking and review.

Analytical functionality is afforded by various filters 630. Popup tooltips may be used provide additional info when user hovers over any data on the dashboard. The tooltips may appear in a popup pane when a cursor positioned by a user hovers over selected data.

An upper right map pane 640 contains a flowsheet diagram, providing geospatial context for the user and therefore a more complete mental map. It shows where HEXs are situated relative to each other and within a particular area of the refinery. They are coded identically to the upper left pane, with size representing amount of heat transfer and color showing fouling resistance. Interactions in the upper left pane 610 affect what is shown in this map pane, as you will see shortly.

The lower left pane's (620) function is to provide more diagnostic information about each HEX over time. These detailed graphs react to interactions in the navigation pane, providing drill down views for deeper understanding. Shell & tube flow rates may be overlaid on a fouling resistance trend in the upper graph. The lower graph reveals shell & tube inlet temperatures, also overlaid on a fouling resistance trend. Measures can be changed with toggle switches.

A toggle section 650 contains toggle functionality to change measures in the detailed graphs. In this case, a user may choose to see raw, smoothed, normalized, or smoothed & normalized line graphs for flow rates and inlet temperatures. This supports user preferences and a greater ability to detect true trends/outliers by comparing various calculations and measures. Keep in mind that other factors could also be toggled, such as LMTD, U_Actual vs. U_Expected, or a direct indication of variability—such as standard deviation.

Many use cases are based on an ability to filter data according to some specific range of criteria. The sliders in filters 630 permit a user to narrow down the complete dataset to find specific HEXs, time intervals, or data points that fit combinations of criteria such as Q, Fouling Resistance, Flow Rates, Inlet Temperatures, etc. Categorizing and benchmarking are as easy as dragging the sliders or entering specific data via keyboard.

A pane 660 houses a website database, extending the dashboard to serve as a launch pad for taking action once the user identifies a problem or issue. It empowers users with the ability to save annotations and notes, flag data points for future reference, share thoughts, and view additional information hosted in the database. This feature of linking the dashboard to other data sources has enormous potential, as it offers a channel for collaboration and action without leaving the current dashboard view.

Figure 7:
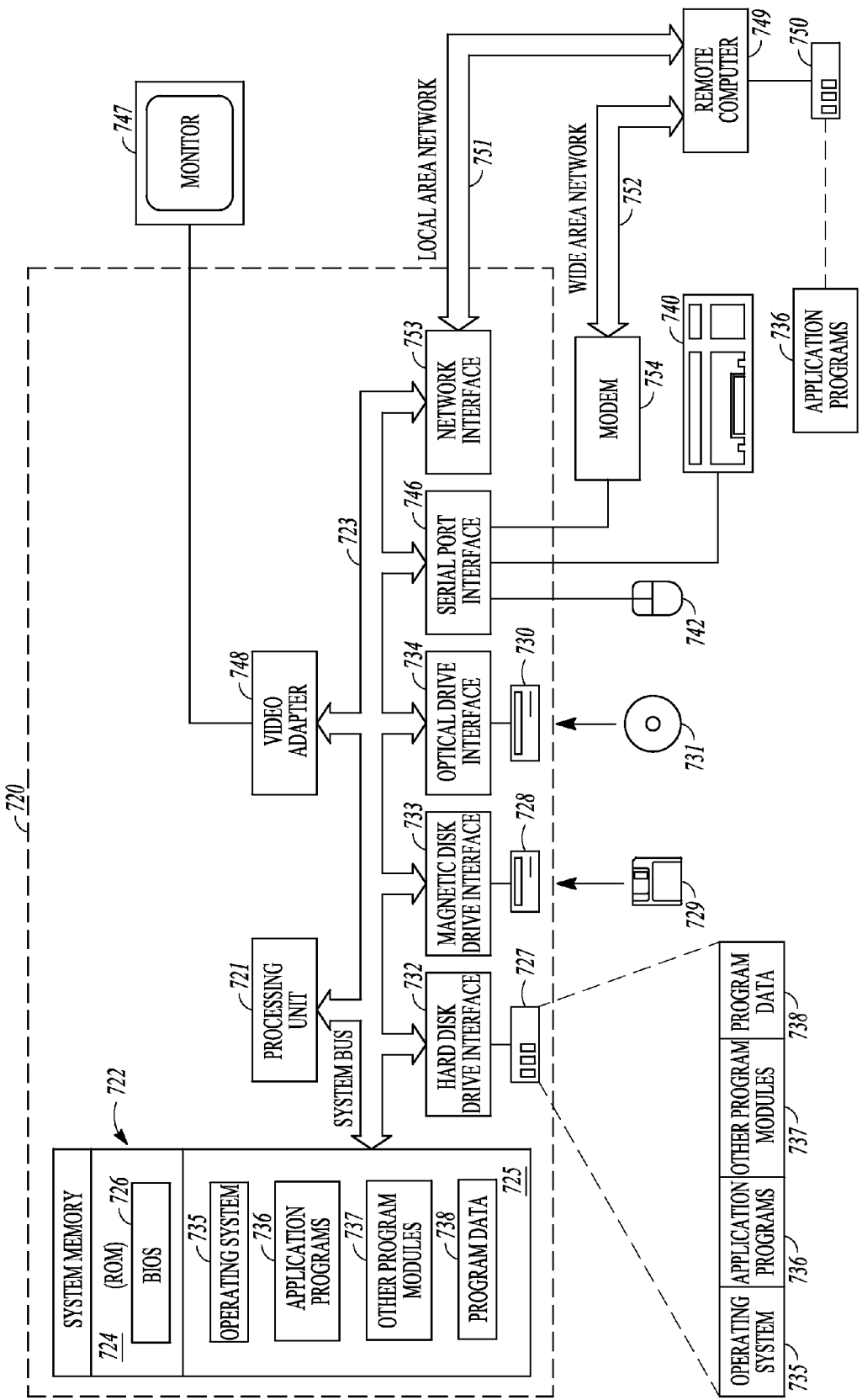
FIG. 7 is a block diagram of an example computer system for performing methods and functions according to an example embodiment.

FIG. 7 is a block diagram of a computer system to implement methods according to an example embodiment. In the embodiment shown in FIG. 7, a hardware and operating environment is provided that may be used to execute the algorithms and provide the dashboard described herein.

As shown in FIG. 7, one embodiment of the hardware and operating environment includes a general purpose computing device in the form of a computer 700 (e.g., a personal computer, workstation, or server), including one or more processing units 721, a system memory 722, and a system bus 723 that operatively couples various system components including the system memory 722 to the processing unit 721. There may be only one or there may be more than one processing unit 721, such that the processor of computer 700 comprises a single central-processing unit (CPU), or a plurality of processing units, commonly referred to as a multiprocessor or parallel-processor environment. In various embodiments, computer 700 is a conventional computer, a distributed computer, or any other type of computer.

The system bus 723 can be any of several types of bus structures including a memory bus or memory controller, a peripheral bus, and a local bus using any of a variety of bus architectures. The system memory can also be referred to as simply the memory, and, in some embodiments, includes read-only memory (ROM) 724 and random-access memory (RAM) 725. A basic input/output system (BIOS) program 726, containing the basic routines that help to transfer information between elements within the computer 700, such as during start-up, may be stored in ROM 724. The computer 700 further includes a hard disk drive 727 for reading from and writing to a hard disk, not shown, a magnetic disk drive 728 for reading from or writing to a removable magnetic disk 729, and an optical disk drive 730 for reading from or writing to a removable optical disk 731 such as a CD ROM or other optical media.

The hard disk drive 727, magnetic disk drive 728, and optical disk drive 730 couple with a hard disk drive interface 732, a magnetic disk drive interface 733, and an optical disk drive interface 734, respectively. The drives and their associated computer-readable media provide nonvolatile storage of computer-readable instructions, data structures, program modules and other data for the computer 700. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 729, optical disk 731, ROM 724, or RAM 725, including an operating system 735, one or more application programs 736, other program modules 737, and program data 738. Programming for implementing one or more processes or method described herein may be resident on any one or number of these computer-readable media.

A user may enter commands and information into computer 700 through input devices such as a keyboard 740 and pointing device 742. Other input devices (not shown) can include a microphone, joystick, game pad, satellite dish, scanner, or the like. These other input devices are often connected to the processing unit 721 through a serial port interface 746 that is coupled to the system bus 723, but can be connected by other interfaces, such as a parallel port, game port, or a universal serial bus (USB). A monitor 747 or other type of display device, including touch screens, can also be connected to the system bus 723 via an interface, such as a video adapter 748. The monitor 747 can display a graphical user interface for the user. In addition to the monitor 747, computers typically include other peripheral output devices (not shown), such as speakers and printers.

The computer 700 may operate in a networked environment using logical connections to one or more remote computers or servers, such as remote computer 749. These logical connections are achieved by a communication device coupled to or a part of the computer 700; the invention is not limited to a particular type of communications device. The remote computer 749 can be another computer, a server, a router, a network PC, a client, a peer device or other common network node, and typically includes many or all of the elements described above I/0 relative to the computer 700, although only a memory storage device 750 has been illustrated. The logical connections depicted in FIG. 7 include a local area network (LAN) 751 and/or a wide area network (WAN) 752. Such networking environments are commonplace in office networks, enterprise-wide computer networks, intranets and the internet, which are all types of networks.

When used in a LAN-networking environment, the computer 700 is connected to the LAN 751 through a network interface or adapter 753, which is one type of communications device. In some embodiments, when used in a WAN-networking environment, the computer 700 typically includes a modem 754 (another type of communications device) or any other type of communications device, e.g., a wireless transceiver, for establishing communications over the wide-area network 752, such as the internet. The modem 754, which may be internal or external, is connected to the system bus 723 via the serial port interface 746. In a networked environment, program modules depicted relative to the computer 700 can be stored in the remote memory storage device 750 of remote computer, or server 749. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

EXAMPLES

1. A method comprising:
    obtaining a database stored on a storage device containing information on multiple assets, the information including measurements taken from devices monitoring each asset, calculated performance measures, and context information corresponding to the environment the items are subjected to;
    grouping assets via a computer system into a homogenous group as a function of selected context information; and
    performing analytics via the computer system on the grouped assets to manage the assets.
2. The method of example 1 wherein assets are grouped as a function of Euclidean distance between at least one dimension of the context information.
3. The method of any of examples 1-2 wherein assets are grouped as a function of Euclidean distance between at least two dimensions of the context information.
4. The method of any of examples 1-3 wherein the context information includes flow rate.
5. The method of any of examples 1-4 wherein the context information includes maintenance history.
6. The method of any of examples 1-5 wherein the context information includes operating modes.
7. The method of any of examples 1-6 wherein the analytics includes benchmarking, troubleshooting, and predictive analysis for maintenance actions.
8. The method of any of examples 1-7 and further comprising generating a dashboard to provide interactive graphical representation of multiple assets.
9. The method of example 8 wherein the dashboard further provides interactive filters for time intervals and measurements.
10. A computer readable medium having instructions for causing a computer to implement a method, the method comprising:
    obtaining a database containing information on multiple assets, the information including measurements taken from devices monitoring each asset, calculated performance measures, and context information corresponding to the environment the items are subjected to;
    grouping assets into a homogenous group as a function of selected context information; and
    performing analytics on the grouped assets to manage the assets.
11. The computer readable medium of example 10 wherein assets are grouped as a function of Euclidean distance between at least one dimension of the context information.
12. The computer readable medium of any of examples 10-11 wherein assets are grouped as a function of Euclidean distance between at least two dimensions of the context information.

13. The computer readable medium of any of examples 10-12 wherein the context information includes maintenance history.
14. The computer readable medium of any of examples 10-13 wherein the context information includes operating modes.
15. The computer readable medium of any of examples 10-14 wherein the analytics includes benchmarking, troubleshooting, and predictive analysis for maintenance actions.
16. The computer readable medium of any of examples 10-15 wherein the method further comprises generating a dashboard to provide interactive graphical representation of multiple assets, wherein the dashboard further provides interactive filters for time intervals and measurements.
17. A system comprising:
a structured data repository stored on a computer readable storage device to store sensed information and maintenance information for multiple assets to be managed;
a performance measure calculator to calculate performance measures for the managed assets;
a calculation service to calculate context variables;
a search engine to group assets as a function of the performance measures and context variables; and
a query interface to provide analytics on the managed assets as a function of the grouped assets.
18. The system of example 17 wherein the analytics include benchmarking, trouble shooting, and predictive analysis.
19. The system of any of examples 17-18 wherein assets are grouped as a function of Euclidean distance between at least one dimension of the context information.
20. The system of any of examples 17-19 and further comprising a user interface module to generate a dashboard interface to provide interactive graphical representation of multiple assets, providing interactive filters for time intervals and measurements.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:
1. A method comprising:
obtaining a database stored on a storage device containing information on multiple assets across multiple geographic locations, wherein the assets include heat exchangers, the information including measurements taken from devices monitoring each asset while each asset is operating including a flow rate of hot and cold streams flowing through the heat exchanger, two temperature measurements of the hot stream and two temperature measurements of the cold stream, calculated performance measures including a heat transfer coefficient calculated based on the flow rate of the hot and cold streams, the two temperature measurements of the hot stream and the two temperature measurements of the cold stream and a fouling resistance, operation problems, solutions to operation problems, and context information corresponding to the environment the assets are subjected to during operation of the asset which affects operation of the assets including a time from last cleaning of the heat exchanger and a rate of change of the measurements determined based on the calculated performance measures;
grouping assets via a computer system into a homogenous group as a function of selected context information such that the homogenous group is formed of assets having similar environmental contexts and includes assets from multiple geographic locations, wherein the grouping is based on one or more of a construction type of the heat exchangers, a range of flow rates based on the measurements, a fouling rate based on the calculated fouling resistance, and a time from last cleaning of the heat exchanger; and
performing analytics via the computer system on the grouped assets to manage the assets based on a comparison to the assets in the homogenous group, wherein managing the assets includes troubleshooting an operation problem with an asset by comparing the context information of the asset with other assets in the homogenous group to identify a solution to the operation problem that worked on other assets in the homogenous group operating under similar conditions, wherein the assets correspond to industrial process control equipment or commercial heating, ventilation, air conditioning (HVAC) systems.
2. The method of claim 1 wherein assets are grouped as a function of Euclidean distance between at least one dimension of the context information.
3. The method of claim 1 wherein assets are grouped as a function of Euclidean distance between at least two dimensions of the context information.
4. The method of claim 1 wherein the context information further includes maintenance history.
5. The method of claim 1 wherein the context information further includes ranges of temperatures determined based on the measurements.
6. The method of claim 1 wherein the analytics includes benchmarking, troubleshooting, and predictive analysis for maintenance actions.
7. The method of claim 1 and further comprising generating a dashboard to provide interactive graphical representation of multiple assets.
8. The method of claim 7 wherein the dashboard further provides interactive filters for time intervals and measurements.
9. A non-transitory computer readable storage device having instructions for causing a computer to implement a method, the method comprising:
obtaining a database containing information on multiple assets across multiple geographic locations, wherein the assets include heat exchangers, the information including measurements taken from devices monitoring each asset while each asset is operating including a flow rate of hot and cold streams flowing through the heat exchanger, two temperature measurements of the hot stream and two temperature measurements of the cold stream, calculated performance measures including a heat transfer coefficient calculated based on the flow rate of the hot and cold streams, the two temperature measurements of the hot stream and the two temperature measurements of the cold stream and a fouling resistance, maintenance actions, and context information corresponding to the environment the assets are subjected to during operation of the asset which affects operation of the assets including a time from last cleaning of the heat exchanger and a rate of change of the measurements determined based on the calculated performance measures;
grouping assets into a homogenous group as a function of selected context information such that the homogenous group is formed of assets having similar environmental contexts and includes assets from multiple geographic locations, wherein the grouping is based on one or more of a construction type of the heat exchangers, a range of flow rates based on the measurements, a fouling rate based on the calculated fouling resistance, and a time from last cleaning of the heat exchanger; and performing analytics on the grouped assets to manage the assets based on a comparison to the assets in the homogenous group, wherein the analytics include a prediction of future behavior of an asset based on a past behavior of assets in the homogenous group to identify maintenance actions to minimize performance degradation, leveraging information about performance measure degradation trends observed on similar assets running under similar operating conditions in the homogenous group, wherein the assets correspond to industrial process control equipment or commercial heating, ventilation, air conditioning (HVAC) systems.

10. The non-transitory computer readable storage device of claim 9 wherein assets are grouped as a function of Euclidean distance between at least one dimension of the context information.

11. The non-transitory computer readable storage device of claim 9 wherein assets are grouped as a function of Euclidean distance between at least two dimensions of the context information.

12. The non-transitory computer readable storage device of claim 9 wherein the analytics includes benchmarking, troubleshooting, and predictive analysis for maintenance actions.

13. The non-transitory computer readable storage device of claim 9 wherein the method further comprises generating a dashboard to provide interactive graphical representation of multiple assets, wherein the dashboard further provides interactive filters for time intervals and measurements.

14. A system comprising:
a structured data repository stored on a computer readable storage device to store sensed information while each asset is operating and maintenance information for multiple assets across multiple geographic locations to be managed, wherein the assets include heat exchangers, and wherein the sensed information includes a flow rate of hot and cold streams flowing through the heat exchanger, two temperature measurements of the hot stream and two temperature measurements of the cold stream;
a performance measure calculator to calculate performance measures for the managed assets including a heat transfer coefficient calculated based on the flow rate of the hot and cold streams, the two temperature measurements of the hot stream and the two temperature measurements of the cold stream and a fouling resistance;
a calculation service to calculate context variables corresponding to the environment the assets are subjected to during operation of the asset which affect operation of the assets, including operation problems and solutions to operation problems, the context variables including a time from last cleaning of the asset and a rate of change of the performance measures determined based on the calculated performance measures and a rate of change of the sensed information determined based on the flow rate of hot and cold streams flowing through the heat exchanger, two temperature measurements of the hot stream, and two temperature measurements of the cold stream;
a search engine to group assets into homogenous groups as a function of the performance measures and context variables such that the homogenous group is formed of assets having similar environmental contexts and includes assets from multiple geographic locations, wherein the grouping is based on one or more of a construction type of the asset, a range of flow rates based on the measurements, a fouling rate based on the calculated fouling resistance, and a time from last cleaning of the asset; and
a query interface to provide analytics on the managed assets as a function of the grouped assets based on a comparison to the assets in the homogenous group, wherein the analytics includes troubleshooting an operation problem with an asset by comparing the context information of the asset with other assets in the homogenous group to identify a solution to the operation problem that worked on other assets in the homogenous group operating under similar conditions, wherein the assets correspond to industrial process control equipment or commercial heating, ventilation, air conditioning (HVAC) systems.

15. The system of claim 14 wherein the analytics include benchmarking, trouble shooting, and predictive analysis.

16. The system of claim 14 wherein assets are grouped as a function of Euclidean distance between at least one dimension of the context information.

17. The system of claim 14 and further comprising a user interface module to generate a dashboard interface to provide interactive graphical representation of multiple assets, providing interactive filters for time intervals and measurements.

* * * * *